United States Patent
Reedijk et al.

(10) Patent No.: US 11,959,237 B2
(45) Date of Patent: Apr. 16, 2024

(54) CREST ELEMENT FOR A BREAKWATER, ARMOUR LAYER ASSEMBLY FOR A BREAKWATER, BREAKWATER, METHOD OF CRESTING A BREAKWATER, AND METHOD OF PROVIDING AN ARMOUR ON A BREAKWATER

(71) Applicant: KONINKLIJKE BAM GROEP N.V., Bunnik (NL)

(72) Inventors: Jan Sebastiaan Reedijk, Bunnik (NL); Robert Pieter Michaël Jacobs, Bunnik (NL); Pieter Bastiaan Bakker, Bunnik (NL)

(73) Assignee: KONINKLIJKE BAM GROEP N.V., Bunnik (NL)

( * ) Notice: Subject to any disclaimer, the term of this patent is extended or adjusted under 35 U.S.C. 154(b) by 0 days.

(21) Appl. No.: 17/613,759

(22) PCT Filed: May 18, 2020

(86) PCT No.: PCT/NL2020/050317
§ 371 (c)(1),
(2) Date: Nov. 23, 2021

(87) PCT Pub. No.: WO2020/242295
PCT Pub. Date: Dec. 3, 2020

(65) Prior Publication Data
US 2022/0228338 A1    Jul. 21, 2022

(30) Foreign Application Priority Data
May 24, 2019 (NL) ...................................... 2023195

(51) Int. Cl.
*E02B 3/12* (2006.01)
*E02B 3/06* (2006.01)

(52) U.S. Cl.
CPC ................ *E02B 3/129* (2013.01); *E02B 3/06* (2013.01)

(58) Field of Classification Search
CPC ... E02B 3/129; E02B 3/06; E02B 3/14; Y02A 10/11
See application file for complete search history.

(56) References Cited

U.S. PATENT DOCUMENTS 3,614,866 A    10/1971   Taisuke et al.
3,759,043 A    9/1973    Tokunaga
(Continued)

FOREIGN PATENT DOCUMENTS

CA    876435    7/1971
CN    101258289 A    9/2008
(Continued)

OTHER PUBLICATIONS

Office Action and Search Report issued in Chinese Patent Application No. 202080038737.6 dated Nov. 2, 2022.
(Continued)

*Primary Examiner* — Carib A Oquendo
(74) *Attorney, Agent, or Firm* — NIXON & VANDERHYE

(57) ABSTRACT

Disclosed is a crest element in an armor layer assembly of a breakwater. The crest element includes: a central part; two wings extending from the central part in opposing directions along, when placed on a breakwater, the length direction of the breakwater; and a nose extending from the central part in a forward direction transverse to the length direction of the breakwater. The backside of the central part is a vertically oriented, back face facing in a backward direction opposite to the forward direction. The crest element may in particular be used as crest element for armor layers including armor elements of the type having a central part from
(Continued)

which: two wings extend in opposing directions, and a tail and nose extend in opposing directions transverse to the direction of extension of the wings. Also disclosed is an armor layer, a breakwater and methods using the crest elements.

18 Claims, 5 Drawing Sheets

(56) References Cited

U.S. PATENT DOCUMENTS

| | | | | |
|---|---|---|---|---|
| 4,347,017 | A | * | 8/1982 | Chevallier .............. E02B 3/129 405/29 |
| 5,620,280 | A | * | 4/1997 | Melby .................... E02B 3/129 405/16 |
| 7,160,057 | B2 | * | 1/2007 | Reedijk ................. B28B 7/0029 405/25 |
| 9,915,049 | B2 | * | 3/2018 | Collinsworth ............ E02B 3/06 |
| 2005/0214075 | A1 | | 9/2005 | Reedijk et al. |
| 2008/0286045 | A1 | | 11/2008 | Medina Folgado et al. |
| 2008/0298894 | A1 | | 12/2008 | Van Den Berge et al. |
| 2010/0104366 | A1 | | 4/2010 | Melby |
| 2013/0023581 | A1 | * | 1/2013 | Yukimoto .............. C04B 24/14 514/565 |
| 2022/0316165 | A1 | * | 10/2022 | Kim ........................ E02B 3/129 |

FOREIGN PATENT DOCUMENTS

| | | |
|---|---|---|
| WO | 97/06309 | 2/1997 |
| WO | 2004/009910 A2 | 1/2004 |
| WO | 2018/052292 | 3/2018 |

OTHER PUBLICATIONS

International Search Report and Written Opinion of the ISA for PCT/NL2020/050317, dated Aug. 28, 2020, 12 pages.

Search Report and Written Opinion of NL2023195, dated May 25, 2019, 10 pages.

Office Action issued in Chilean Patent Application No. 202103088 dated Mar. 3, 2023.

* cited by examiner

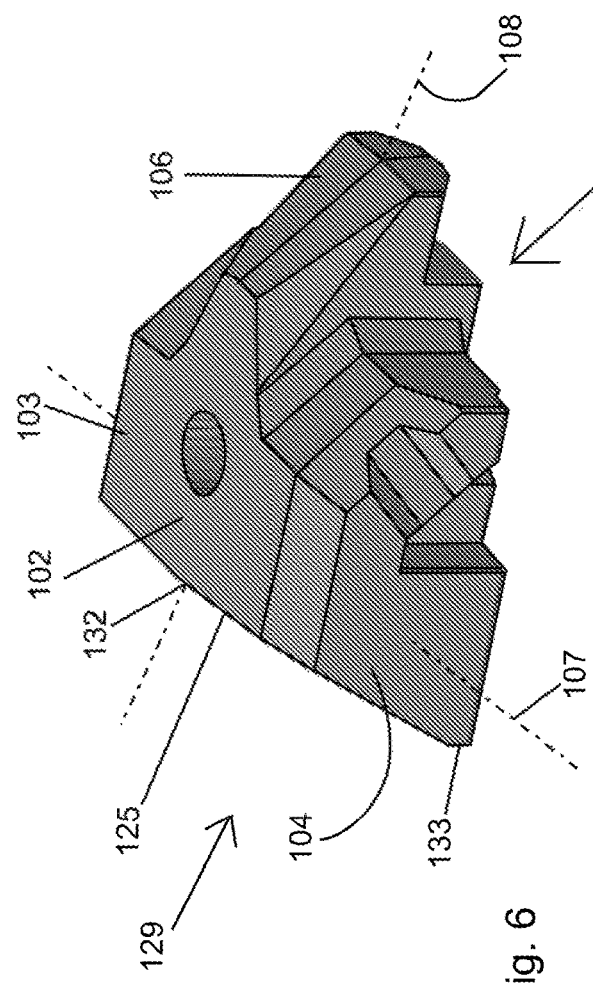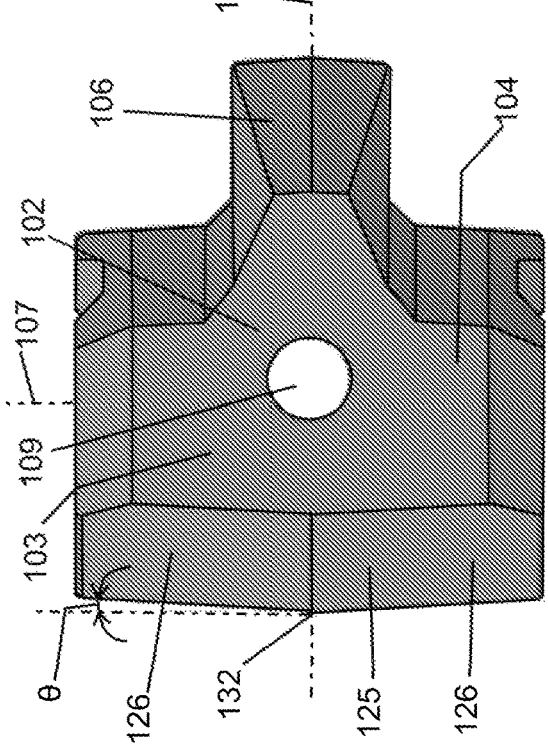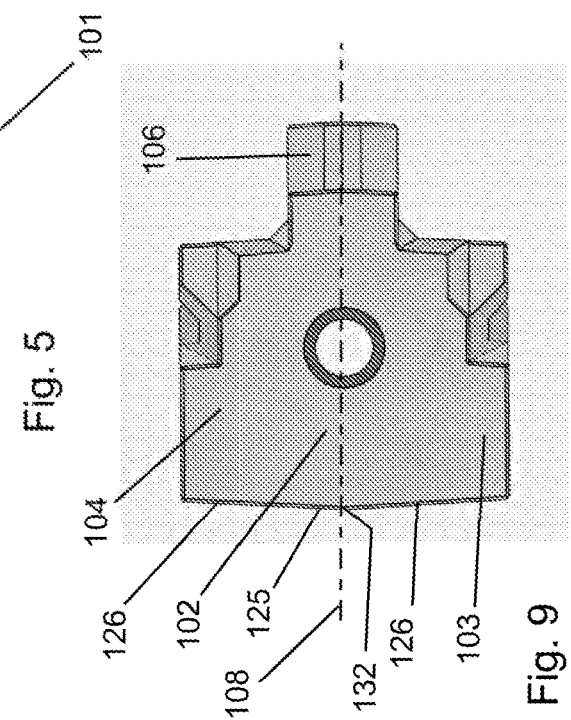

CREST ELEMENT FOR A BREAKWATER, ARMOUR LAYER ASSEMBLY FOR A BREAKWATER, BREAKWATER, METHOD OF CRESTING A BREAKWATER, AND METHOD OF PROVIDING AN ARMOUR ON A BREAKWATER

This application is the U.S. national phase of International Application No. PCT/NL2020/050317 filed 18 May 2020, which designated the U.S. and claims priority to NL Patent Application No. 2023195 filed 24 May 2019, the entire contents of each of which are hereby incorporated by reference.

FIELD OF THE INVENTION

The present invention relates in general to a breakwater.

A breakwater has a horizontally extending, elongate core body with one or two sloping sides. In general a filter layer and/or an under-layer is/are provided on the sloping side(s) and optionally also at the toe of the sloping side(s) at the bottom of the adjacent water. As a top layer, the sloping side(s) are covered with an armour layer.

BACKGROUND OF THE INVENTION

At the upper side of an armour layer, so called crest elements, sometimes also referred to as crown elements, may be provided for different reasons. Crest elements may for example be provided to delimit the armour layer from a construction above the armour layer, for example a road or promenade. In case of low crested breakwaters, crest elements may also be provided to prevent waves rolling over the breakwater. In both cases, the crest elements are basically L-shaped. The vertical leg of the L-shape provides the limitation between the armour layer and the construction above it or prevents the rolling over of waves, respectively. The horizontal leg projects away from the armour layer and serves the purpose to provide the crest element stability in order to allow the vertical leg to be vertically upright and to withstand waves.

Referring to applicant's WO-2018/052292 it is known that the armour layer can be made from armour elements—referred to as cover elements in WO-2018/052292—laid in a roof tile like fashion on the slant of a breakwater. The armour element of WO-2018/052292 comprises a central part, two wings—referred to as noses in WO-2018/052292—projecting from the central part in opposite directions, a nose—referred to as first leg in WO-2018/052292—projecting from the central part in a forward direction transverse to the extension of the wings, and a tail—referred to as second leg in WO-2018/052292—extending from the central part in a backward direction opposite to the forward direction. This armour element of WO-2018/052292 may optionally have a third leg extending from the central part in upward direction transverse to the forward/backward direction and transverse to the wings. Providing the armour element of WO-2018/052292, on top of the third leg, with a fourth leg extending from the central part in downward direction opposite to the upward direction, may result in an armour element according to applicant's WO-2004/009910.

The armour elements of the type of WO-2018/052292 as well as WO-2004/009910 have projections—like the wings, tails, noses—projecting from the central part, which projections provide, when laid as an armour layer, interspaces through which water of waves acting on the breakwater passes. When the water passes through these interspaces energy of the waves is dissipated by damping.

At the transition of an armour layer with armour elements according to WO-2018/052292 or to a horizontal construction, like a road or boulevard, either L-shaped crest elements are used or the upper projections of the upper armour elements are embedded in the foundation layer(s) of the road/boulevard.

SUMMARY OF THE INVENTION

The present invention has as its object to provide an alternative crest element, which may in particular be used as crest element for armour layers comprising armour elements of the type having a central part from which i) two wings extend in opposing directions and ii) a tail and nose extend in opposing directions transverse to the direction of extension of the wings. Armour elements of this type are for example the ones of WO-2018/052292 or WO-2004/009910 FIG. 3.

This object is according to a first aspect of the invention achieved by providing a crest element for an armour layer of a breakwater, wherein the crest element comprises:
  a central part,
  two wings extending from the central part in opposing directions along, when placed on a breakwater, the length direction of the breakwater,
  a nose extending from the central part in a forward direction transverse to the length direction of the breakwater; and
  wherein the backside of the central part is a vertically oriented, back face facing in a backward direction opposite to the forward direction.

The crest element according to the invention thus has a central part having an upper side, a lower side, a back side being a back face, a front side from which a nose projects, a left side from which a left wing projects and a right side from which a right wing projects. In use—i.e. when the crest element is placed on a breakwater—the x-axis is parallel to the length direction of the breakwater and the x-axis and y-axis are both essentially horizontal.

Contrary to the armour elements of the type with two wings, a nose and a tail, such as the amour elements according to WO-2018/052292 or WO-2004/009910 FIG. 3, the (central part of the) crest element according to the invention has no substantial projection, like a so called tail, at the backside. Instead the backside of the central part consists of a vertically oriented, back face.

The back face of the crest element according to the invention may be called a flush back face and allows an easy and smooth transition from the armour layer to the construction above the armour layer, like a road or boulevard. From an esthetical point of view the transition obtained with a crest element according to the invention may be called slimline, due to no additional crest element of substantially different shape and configuration than the armour elements being required and due to non-efficient water energy damping interspaces of the armour layer adjacent the transition being avoided. This slimline transition however also allows for more efficient breakwater designs, and consequently more efficient breakwaters. This because the effectively no wave energy damping transition is, viewed transverse to the length direction of the breakwater, kept smaller, resulting in space gained which may be used for efficiently wave energy damping constructive measures and/or for designing the breakwater with a smaller width (transverse to its length).

Further, the front side—facing away from the breakwater towards the water—of the crest element according to the invention does have similar or about the same wave energy damping functionality as the armour elements of the armour layer, without, viewed transverse to the armour layer, the crest element (inefficiently) projecting above the armour layer. When a crest element projects above the armour layer, as is the case with L-shaped crest elements serving the purpose to prevent waves from rolling over, it will dissipate wave energy by braking action not by damping action. Waves thrown against a projecting crest element will be braked abruptly resulting in large forces acting on the crown element to push it over. Actually tumbling over of the projecting crest element will be counteracted by the horizontal, backwardly projecting leg. This backwardly projecting leg will exert downward forces on the breakwater which in turn will require constructive measures to be able to withstand or reduce these forces.

The armour layer with which this crest element according to the first aspect of the invention can be used, may be formed by horizontal rows of armour elements, in which each armour element comprises a central part, two wings extending from the central part in opposing directions along a length direction of the breakwater, a tail extending from the central part in a backward direction towards the breakwater and transverse to the length direction of the breakwater, and a nose extending from the central part in a forward direction opposite to the backward direction. In a further embodiment of such an armour layer the wings of the armour elements of each horizontal said row may additionally be mutually aligned and the noses of the armour elements of an above horizontal row of armour elements may be supported on the armour elements of a below horizontal row of armour elements. In this further embodiment of the armour layer, the horizontal rows are so to say stacked onto each other along the slope of the breakwater such that the noses of armour elements of an above horizontal row of armour elements are supported on the armour elements of a below horizontal row of armour elements, resulting in the armour elements being laid in a roof tile like fashion on the slant of the breakwater. This arrangement in a roof tile like fashion may be an aligned arrangement, but preferably is a staggered arrangement. In the aligned arrangement, the nose of an armour element of an above horizontal row is supported on the upper side of the tail of an armour element of a below horizontal row of armour elements, resulting in that, viewed in the direction of the slope of the breakwater, the armour elements are arranged in aligned rows as well. In the preferred staggered arrangement, the nose of a said armour element of an above said row of armour elements is supported on two wings of two adjacent said armour elements of a below said row of armour elements, whilst the wings of this same armour element are supported on the tails of the same two adjacent armour elements of the below row of armour elements, resulting in that, viewed in the direction of the slope of the breakwater, the armour elements are arranged in staggered horizontal rows.

According to a further embodiment of the crest element according to the first aspect of the invention, the backside of the wings is a vertically oriented, back face which is generally flush with the back face of the central part. This allows the crest element according to the invention being arranged in a horizontal row with the wings of the crest elements being aligned. The back faces of the wings being generally flush with the back face of the central part of the crest element, provide in length direction of the breakwater a generally uninterrupted back surface of the crest element. When these crest element are placed in a row with the wings aligned, the consecutive crest elements provide on the back side of the row, viewed in length direction of the row, a generally ongoing façade or wall, which façade/wall may present slits between the tips of adjacent wings.

According to a further embodiment of the crest element according to the invention, the back faces of the wings may be, viewed in length direction of the breakwater, coplanar with the back face of the central part to provide a smooth, so to say invisible, transition.

According to another further embodiment of the crest element according to first aspect of the invention, the central part, two wings and nose are formed as a single part, such as a single part made from concrete. The concrete may be reinforced or non-reinforced concrete.

According to still another further embodiment of the crest element according to first aspect of the invention, the underside of the central part is a horizontal bottom face. According to this embodiment, the underside of the (central part of the) crest element has no substantial projection. In a further embodiment of this embodiment also the upper side of the central part may be a horizontal face, in this case a horizontal top face. In which latter case, the upper side of the (central part of the) crest element has no substantial projection.

According to again still another further embodiment of the crest element according to first aspect of the invention, an x-axis is defined by the direction of extension of the wings, an y-axis perpendicular to the x-axis is defined by the direction of extension of the nose, and an xy-plane is defined by the plane spanned by the x-axis and y-axis. In further embodiments of this embodiment:

the back face of the central part slants with respect to the xy-plane, the slant being, viewed from the underside of the crest element towards the upper side of the crest element, in the forward direction; The slanting back face also results in that the center of gravity of the crest element being moves forward and is lowered and in that the point of rotation of the crest element when lifted by waves is shifts backwards, thus enhancing the stability of the crest elements against overturning by waves which may roll over. When a fill-material is provided next to the backside of the crest element, the slanting back side provides some additional advantages. The slanting back face allows additional forces being applied by the fill-material on the crown element and armour layer. A slanted back face of the crest element will, due to the fill-material, experience a force exerted by the fill-material which will press down the armour layer, thus improving the stability of the armour layer against being lifted or displaced by wave forces. In case the fill-material comprises large stones or infiller blocks, for example made of concrete, the slanting back face assists in providing a perfect connection between the crown element and stone or infiller block also in case the stone or infiller block does not fit perfectly. The improved stability obtained due to shifting the centre of gravity and point of rotation, applies both with and without a fill-material;

and/or the angle between the back face and the xy-plane is at most 80°, such as at most 75° or at most 70°; In order to ensure that fill-material will exert a noticeable contributing force on the crest element, the angle will be at most 80°. In order that the force exerted by the fill-material is substantially effective the angle is at most 75°. When the angle is at most 70°, the effect of the shift of the centre of gravity and the shift of point of rotation is effective in efficient manner. Further an angle of at most 75° or at most 70° may be helpful in guiding fill-material—which in case of breakwaters frequently comprises crumbles of stony material—is properly guided downward along the sloping back face without compacting being required. This is in relation to breakwaters of special relevance because in case water may enter into the fill-material, the fill material may be fluidized and require proper self-settling after the water has left the fill-material, without a compacting action being required;

and/or the angle between the back face and the xy-plane is at least 50°, such as at least 60°;

and/or the angle between the back face and the xy-plane is in the range of about 55° to about 80°, preferably in the range of about 60° to about 75°;

and/or the angle between the back face and the xy-plane is in the range of about 60° to about 70°, such as about 65°.

In case the wings may have back faces flush with the back face of the central part, the back faces of these wings will slant as well and the embodiments and considerations described in this paragraph apply mutatis mutandis to the slanting back faces of the wings as well.

The object of the invention is according to a second aspect of the invention achieved by providing an armour layer assembly for a breakwater, comprising:

a plurality of horizontal rows of armour elements, a horizontal row of crest elements placed above the upper row of the plurality of horizontal rows of armour elements;

wherein each crest element is a crest elements according to the first aspect of the invention;

wherein a said armour element comprises a central part, two wings extending from the central part in opposing directions along a length direction of the breakwater, a tail extending from the central part in a backward direction towards the breakwater and transverse to the length direction of the breakwater, and a nose extending from the central part in a forward direction opposite to the backward direction;

wherein the wings of the armour elements of each said row are mutually aligned;

wherein the wings of the crest elements of the row of crest elements are mutually aligned;

wherein the noses of the armour elements of an above row of armour elements are supported on the armour elements of a below row of armour elements; and wherein the noses of the crest elements of the row of crest elements are supported on the armour elements of the upper row of armour elements.

This results in a an roof tile like arrangement of armour elements and crest elements according to the invention. As explained above this may be an aligned arrangement, but is preferably a staggered arrangement.

According to a further embodiment of the second aspect of the invention, the staggered arrangement may be worded as: wherein the nose of a said armour element of an above said row of armour elements is supported on two wings of two adjacent said armour elements of a below said row of armour elements; wherein the wings of the said armour element of the above said row of armour elements are supported on the tails of the two adjacent said armour elements of the below row of armour elements, wherein the nose of a said crest element of the row of crest elements is supported on two wings of two adjacent said armour elements of the upper row of armour elements; and wherein the wings of the said crest element of the row of armour elements are supported on the tails of the two adjacent said armour elements of the upper row of armour elements. The staggered arrangement provides on the one hand an interaction between all armour elements of the armour layer which interaction keeps the armour elements in place, whilst on the other hand relatively large interspaces between the armour elements are provided for damping wave forces by allowing the water to pass through the interspaces.

The object of the invention is according to a third aspect of the invention achieved by providing a breakwater having at least one sloping side provided with:

a row of crest elements according to the first aspect of the invention, or an assembly according to the second aspect of the invention.

According to a further embodiment of the third aspect of the invention, the breakwater having a top and the central parts having a slanting back face: the row of crest elements is provided below the top of the breakwater such that an interspace is defined between the back faces of the row of crow of crest elements and the breakwater; wherein the interspace, viewed in vertical upward direction and adjacent the back faces, diverges; and the interspace is filled with a fill-material exerting on the back faces force having a component parallel to the back face and a component transverse to the back face. Here 'filled' means that the interspace is at least partly filled, but may be about fully filled as well. As explained above in relation to an embodiment of the first aspect, the fill-material will contribute in the stability of the armour layer and crest elements by exerting a force onto the slanting back face of the central part, as well as—in case of wings with slanting back faces—on the slanting back face of the wings.

According to another further embodiment of the third aspect of the invention, the breakwater having two opposite, sloping sides coming together at a top of the breakwater and central parts having a slanting back face: the rows of crest elements are arranged at the top of the breakwater such that the back faces of both rows define, viewed in vertical upward direction, a diverging interspace; and the diverging interspace is filled with a fill-material exerting on the back faces a force having a component parallel to the respective back face and a component transverse to the respective back face. Here 'filled' means that the interspace is at least partly filled, but may be about fully filled as well. As explained above in relation to an embodiment of the first aspect, the fill-material will contribute in the stability of the armour layer and crest elements by exerting a force onto the slanting back face of the central part, as well as—in case of wings with slanting back faces—on the slanting back face of the wings.

According to still another further embodiment of the third aspect of the invention, the fill-material comprises crumbles of stony material (like natural stone, artificial stone or concrete) and/or asphalt, like an asphalt road.

According to again still another further embodiment of the third aspect of the invention, the angle of the back face of the central part with respect to the horizontal plane is configured such that a line perpendicular to the back face defines an angle with respect to the horizontal plane which is smaller than the angle of the slope with respect to the horizontal plane.

According to a fourth aspect of the invention, there is provided a method of cresting an armour layer of a breakwater, wherein the cresting is provided by placing a horizontal row of crest elements according to the first aspect of the invention.

According to a fifth aspect of the invention, there is provided a method of providing an armour on the sloping side of a breakwater, wherein the sloping side is provided by placing an armour layer assembly according to the second aspect of the invention on the sloping side.

According to a sixth aspect of the invention, there is provided a method of providing a breakwater, wherein the breakwater provided is a breakwater according to the third aspect of the invention.

SHORT DESCRIPTION OF THE DRAWINGS

In the drawings:

FIG. 1 shows a perspective view of a prior art armour element from WO-2018/052292;

FIG. 2 schematically shows a breakwater, in a perspective front view, which breakwater is provided with staggered rows with armour elements according to FIG. 1;

FIG. 3, schematically shows a side view of FIG. 2;

FIG. 5 shows a perspective view of a crest element according to the invention;

FIG. 6 shows a top view onto the upper side of the crest element of FIG. 5;

FIG. 7 shows a side view onto the left side of the crest element of FIG. 5;

FIG. 8 shows a front view onto the front side of the crest element of FIG. 5;

FIG. 9 shows a bottom view onto the underside of the crest element of FIG. 5;

Figure 10:
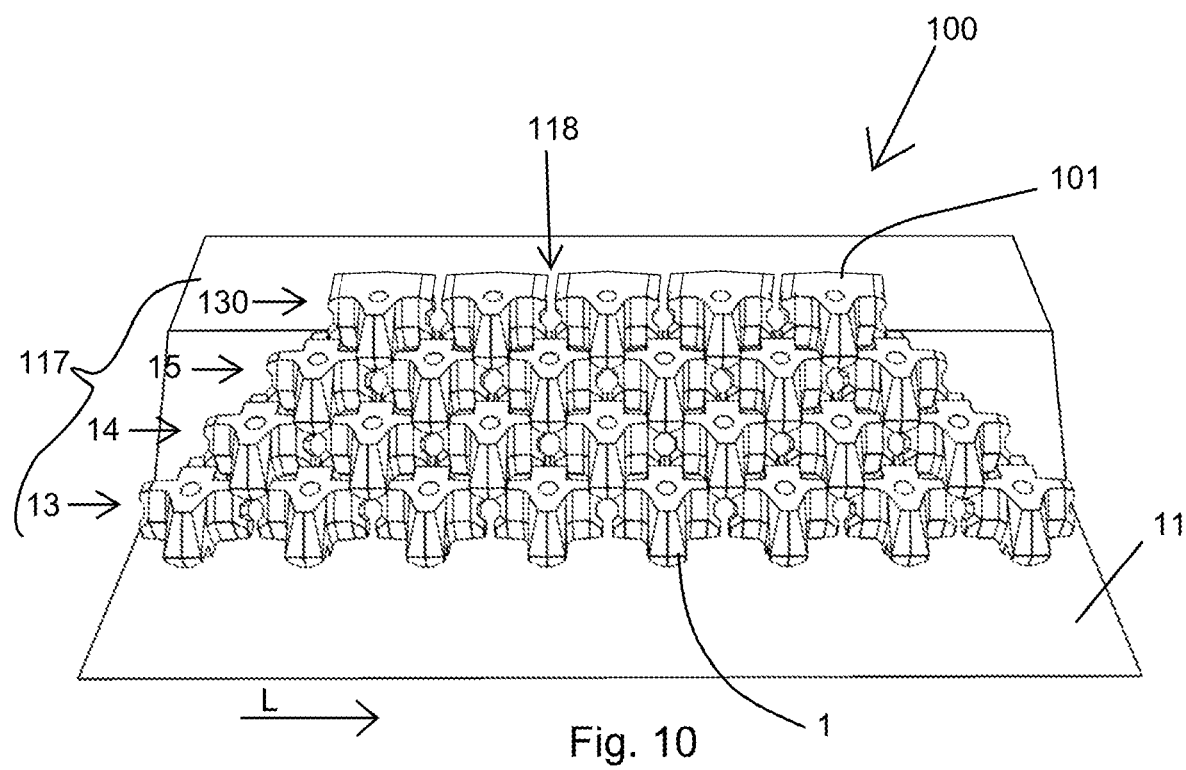
FIG. 10 shows, in a perspective front view (similar to FIG. 2), a first embodiment of a breakwater according to the invention provided with crest elements according to the invention.
Figure 11:
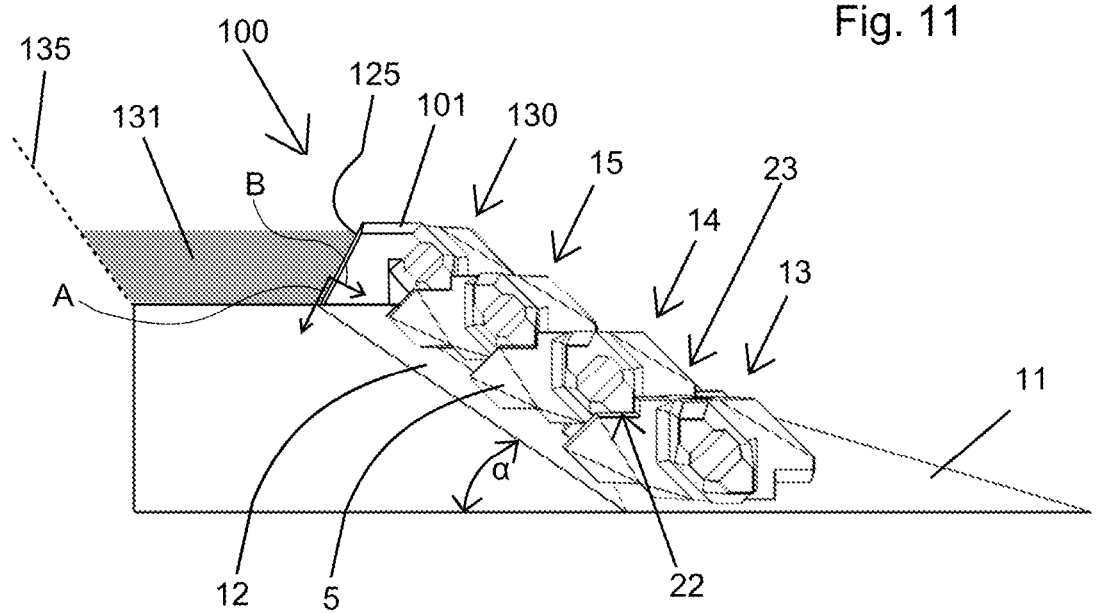
Figure 12:
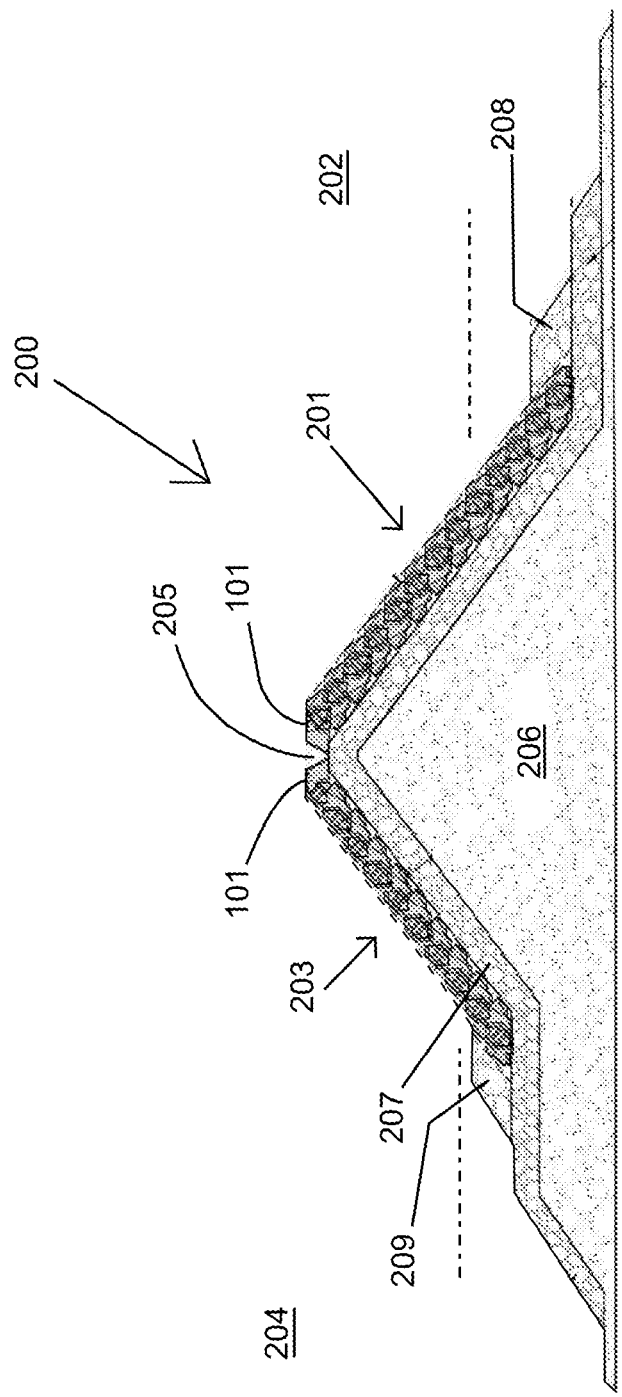

FIG. 11 schematically shows a side view of the breakwater of FIG. 10 (similar to FIG. 3); and FIG. 12 shows, in cross sectional view, a second embodiment of a breakwater according to the invention.

DESCRIPTION OF EMBODIMENTS OF THE INVENTION

Figure 1:
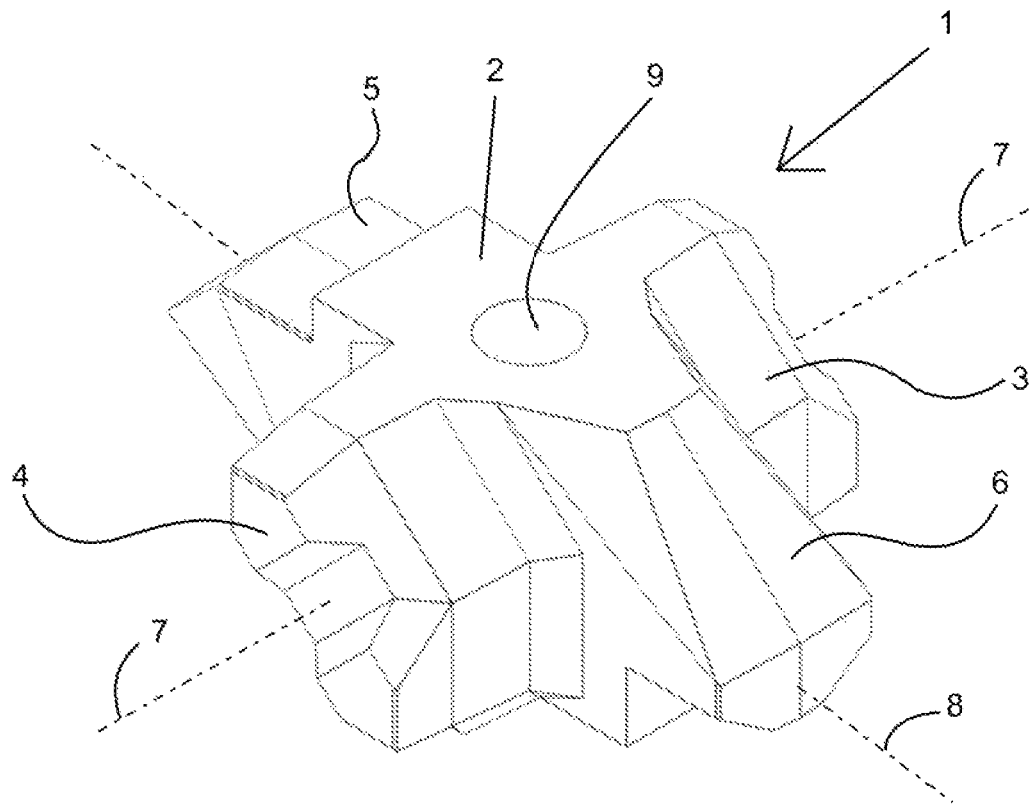

FIG. 1 shows by way of example an armour element 1 of the type having a central part 2 from which:
two wings 3, 4 project in opposing directions, and
a tail 5 and nose 6 project in opposing directions transverse to the direction of extension of the wings 3, 4.

As can be seen in FIG. 1: the right wing 3 has a direction of extension along a horizontal axis 7 and the left wing 4 has a direction of extension along the same horizontal axis 7, but in a direction opposite to the direction of extension of the right wing 3; the tail 5 has a direction of extension along the horizontal axis 8 and nose 6 has a direction of extension along the same horizontal axis 8, but in a direction opposite to the direction of extension of the tail 5; and the horizontal axis 7 is transverse with respect to the horizontal axis 8.

The example armour element of FIG. 1 corresponds to the armour element of FIG. 14 of applicant's WO-2018/052292. For further details of this armour element 1, reference is made to WO-2018/052292, which describes and explains amongst others the shapes and functionalities of the wings 3, 4, tail 5, nose 6 and passage 9 vertically through the central part. WO-2018/052292 also shows other examples of an armour element of the above type having a central part from which two opposing wings and a tail and opposing nose project.

Figure 4:
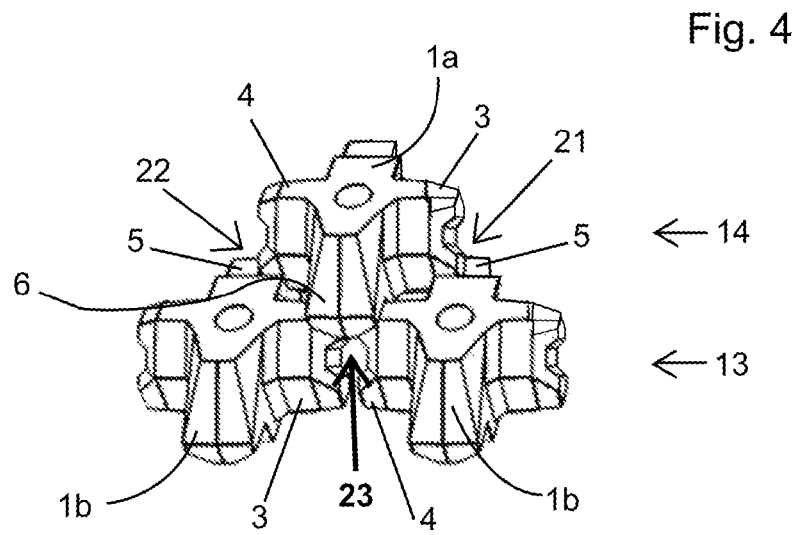
FIG. 4 shows as a detail of FIG. 2, in perspective view, how the armour element of an above row of armour elements is supported on two same armour elements of a below row of armour elements.
Figure 2:
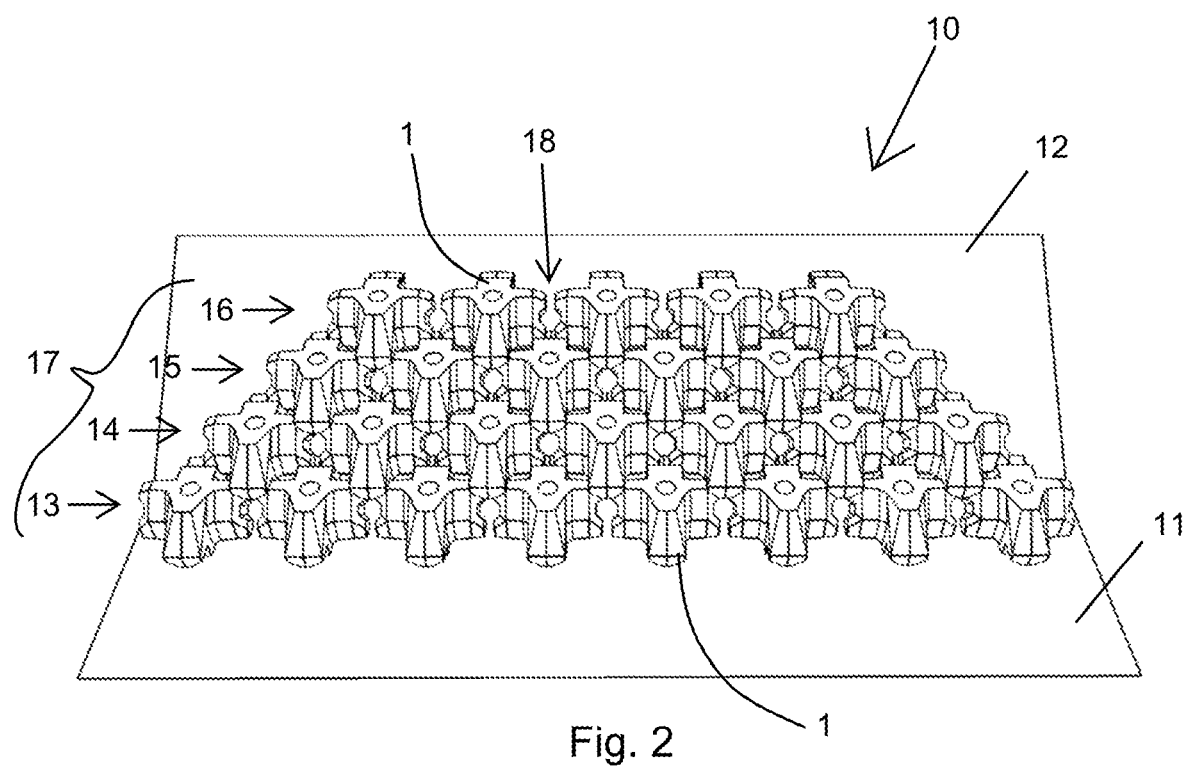
Figure 3:
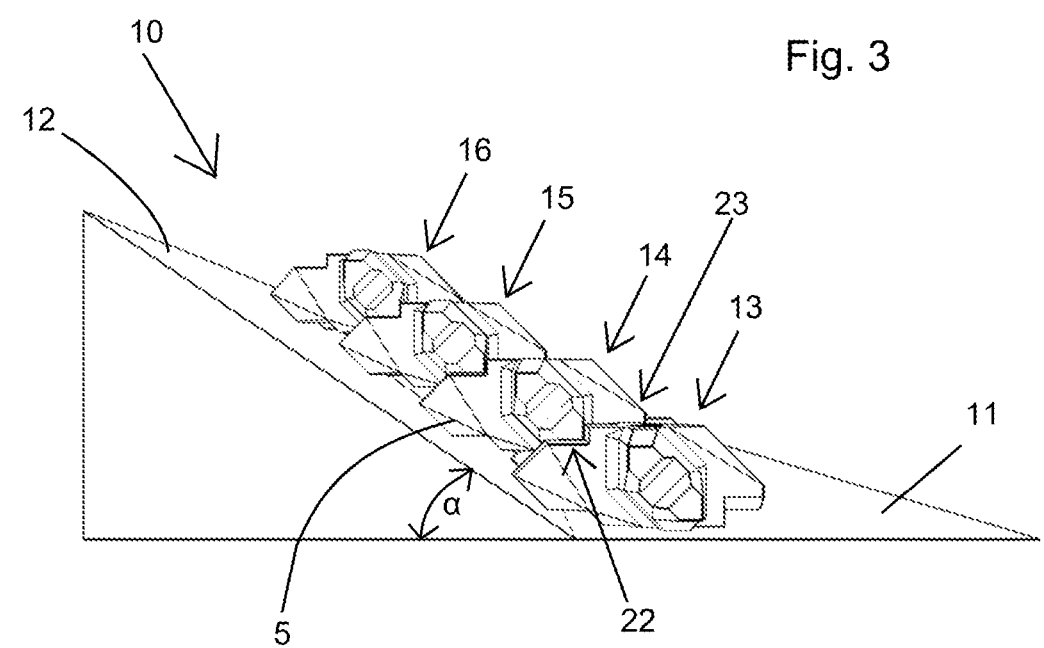

As shown in the example of FIGS. 2-4, an armour element 1 of the above mentioned type can be laid in a plurality of rows along the slope of a breakwater. Referring to FIGS. 2 and 3 the breakwater 10 is shown very schematically with its slope 12 and toe zone 11 (also referred to as foot zone). The toe zone 11 is shown as a generally horizontal surface and the slope 12 is shown as a slanting surface. The slope angle α of a breakwater is in general in the range of about 30° to about 60°. In the example of FIGS. 2-3 the slope angle α is about 33°.

In the example of FIGS. 2-3, the armour layer 17 comprises four rows 13-16 of armour elements 1. The armour elements 1 of the lower most row 13 rest with their undersides on the toe zone 11. From the toe zone upwards, the row 14 of armour elements 11 is supported on the lower most row 13 of armour elements and on the slope 12; the row 15 of armour elements 11 is supported on the row 14 of armour elements and; and the upper row 16 of armour elements 11 is supported on the row 15 of armour elements and on the slope 12. As can be seen in FIG. 2, the wings 3, 4 of the armour element of the lower most row are, in horizontal direction parallel to the length direction of the breakwater, aligned with respect to each other. In similar manner, the wings of the armour elements of the other rows are aligned with respect to each other as well. In each row, the tip of a right wing 3 may touch the tip of adjacent left wing 4, but as indicated by arrow 18 in the middle of the upper row 16 a slit or gap may very well be left in between these tips. Although these slits are in FIG. 2 only clearly visible for the upper row 16, it will be understood that these slits 18 may also be present in the other rows 13, 14 and 15.

This application also uses the terms above row of armour elements and below row of armour elements. The terms above and below are here used to indicate the mutual relationship of two adjacent rows of armour elements, the below row lying (diagonally) below the above row or, vice versa, the above row lying (diagonally) above the below row.

As can be seen in FIG. 3, the tails 5 of the armour elements are supported on the slope 12. As is best seen in FIG. 4, but can also be seen FIGS. 2 and 3, the armour elements of an above row, for example row 14, are supported on the armour elements of a below row, for example row 13. As is indicated by arrows 21, 22 and 23 in FIG. 4, an armour element 1a of an above row 14 has 3 points of support on two adjacent armour elements 1b of a below row 13. At the location 21, the underside of the right wing 3 of armour element 1a of the above row is supported on the upper side of the tail 5 of the armour element 1b on the right. At the location 22, the underside of the left wing 4 of armour element 1a of the above row is supported on the upper side of the tail 5 of the armour element 1b on the left. At the location 23, the underside of the nose 6 of armour element 1a of the above row is supported on the upper side of the right wing 3 of the armour element 1b on the left as well as on the upper side of the left wing 4 of the armour element 1b on the right. The location 23 can be said to provide two points of support.

The arrangement of rows as shown in FIGS. 2-4 is called a staggered arrangement. The armour elements 1a of an above row are staggered or shifted with respect to the armour elements 1b of a below row. Each armour element 1a of an above row is so to say supported on two armour elements of a below row. It is also conceivable to arrange the rows of armour elements in aligned arrangement. In the aligned arrangement the armour element 1a of an above row will be supported generally on one armour element 1b of a below row. The underside of the nose 6 of an armour element 1a of an above row will then be supported on the upper side of the tail 5 of an armour element 1b of a below row.

FIGS. 2 and 3 correspond to FIG. 21 respectively FIG. 20 of WO-2018/052292. For further details of staggered as well as aligned arrangement of the rows of an armour layer, reference is made to WO-2018/052292, not only to its FIGS. 20, 21 and associated text, but more in general to the entire WO-2018/052292, amongst which the parts relating to the so called second aspect of WO-2018/052292 to which FIGS. 6, 13, and 20-23 are specifically dedicated.

As follows, the nose 6 is more in general a protrusion from the central part 2 serving the purpose of finding support on a lower layer of armour elements. This nose 6 may be referred to with many names, like protrusion or beak in case it may look like a beak. Similar applies for the nose 106 of the crest element according to the invention, which will be discussed below.

FIGS. 5 to 9 show a crest element 101 according to the invention, FIG. 5 being a perspective view, FIG. 6 being a top view onto the upper side, FIG. 7 being a side view onto the left side, FIG. 8 being a front view onto the front side of the crest element 101, and FIG. 9 being a bottom view onto the underside of the crest element 101.

In the example of FIGS. 5-9, the front half of the crest element 101 is about identical to the front half of the armour element 1 of FIGS. 1-4. Parts of crest element 101 which are similar to respective parts of the armour element 1 are indicated with the same reference number increased by hundred. Like the armour element 1, the crest element 101 has a central part 102 from which project a right wing 103, a left wing 104 and a nose 106. The wings 103 and 104 extend in opposing directions along horizontal axis 107 and the nose 106 extends along a horizontal axis 108 transverse to axis 107. The plane defined by the axes 107 and 108 is called here the xy-plane.

The crest element 101 differs from the armour element 1 essentially in its backside 129.

As can be seen in the FIGS. 5-9, the backside of the central part 102 is a vertically oriented back face 125, which may slope at an angle γ=90°−β—(for β see FIG. 7)—with respect to the xy-plane as defined by the axes 107 and 108. In the embodiment of the crest element 101 shown in FIGS. 5-9, the angle γ is about 65°, i.e. β is about 25°. The angle γ may however also be larger or smaller than 65°. The angle γ may be in the range of about 55° to about 80°, and may be preferred to have a value in the range of about 60° to about 75°. The angle γ being smaller than 80°, serves the purpose of exerting a sideward force by means of soil material and/or crumbles of stony material as is illustrated in FIGS. 10 and 11 with reference numbers 131 and 205. It is however noted that the angle γ may according to an embodiment of the invention also be in the range of 80-90° or even larger than 90°.

As can be seen in FIGS. 5, 6, 7 and 9, the back face 125 of the central part 102 may present in its middle, at the level of the axis 108, a kink 132. The angle θ of the kink—see FIG. 6—may for example be about 4° with respect to axis 107. It is however to be noted that the kink may be a little larger or that the back face of the central part may also be substantially flat, in which case the kink angle θ will be about 0°. When in this application the term kink is used, this kink may in general have a kink angle θ in the range of 0° to about 7°.

Further, as can be seen in FIGS. 5 and 7, the back face 125 of the central part 102 may present at its lower end a discontinuity 133, in this example a receding section receding with respect to the slanting section of the back face 125. A protruding section, like a rib, quite small relative to the size of the crest element is conceivable as well.

In the embodiment shown, the vertically directed, back face 125 of the central part 102 is generally flat, and may, notwithstanding the discontinuity 133 and/or the kink 132, be called a flush back face 125.

Referring to FIGS. 5, 6 and 7, it can be seen that in this embodiment the backside of the wings 103 and 104 is a vertically oriented, back face 126 as well, which in this embodiment has at its lower end a discontinuity 133 in the form of a receding section as well. The vertically directed, back face 126 of the wings 103, 104 is generally flat and may, notwithstanding the discontinuity and a possible kink, be called a flush back face 126.

Further, the back faces 126 of the wings may be flush with the back face 125 of the central part. As shown in FIGS. 5 and 6, the back faces 126 of the wings 103, 104 may even be coplanar with the back face 125 of the central part 102. It is however noted that a kink, like the kink 132 in the back face 125 of the central part 102, may be present as well at about the transition(s) between the back face 125 and back face(s) 126. Further the back faces 126 of the wings itself may present a kink, like the kink 132 in the back face 125 of the central part 102.

As can be seen in FIGS. 5-9, the underside of the central part 102 of the crest element may be a horizontally oriented bottom face, which in this embodiment is generally flat. In the embodiment shown in FIGS. 5-9, not only the underside of the central part 102 is generally flat but the underside of the entire crest element is also generally flat. A horizontally directed bottom face additionally facilitates placement of the crest elements on a horizontal part of the breakwater. Further as elucidated in WO-2018/052292, it may facilitate placement of the elements in a regular pattern as well.

As can be seen in FIGS. 5-9, also the upper side of the central part 102 of the crest element may be a horizontally oriented top face, which in this embodiment is generally flat. This is however optional.

Before going to FIGS. 10-12, it is noted in general that with a breakwater according to the invention, the slope angle α may be in the range of about 30° to about 40°, such as about 37°.

FIGS. 10 and 11 show views very similar as the views of FIG. 2 respectively 3. The main difference between FIGS. 10 and 11, on the one hand, and FIGS. 2 and 3, on the other hand, is that the upper row 16 of armour elements 1 in FIGS. 2-3 has been replaced by a row 130 of crest elements 101 and that the vertical height of the breakwater 100 has been lowered in order to illustrate the functionality of the crest elements 101 according to the invention. Note however, that the lowering of the breakwater 100 is only for the purpose of illustration. The breakwater 100 of FIGS. 10-11 may equally well be of same height as or higher height than the breakwater 1 of FIGS. 2-3.

FIGS. 10-11 show a breakwater 100 having, in this example, three rows 13, 14, 15 of armour elements according to FIG. 1 and a top row 130 of crest elements 101 according to the invention. As the front half of the crest elements 101 is configured about the same as the (front half of) the armour elements 1, the crest elements 101 can be supported on the upper row 15 of armour elements 1 in the same manner as described in relation to FIGS. 2-4.

As can be seen in FIG. 10, a slit 118 may be left between the tips of adjacent wings 103, 104. As will be understood, this slit may however also be absent in case the tips of the wings 103, 104 touch each other.

As can be seen in FIG. 10, the back faces of the wings and central parts of the consecutive crest elements 101 provide, viewed in the length direction L of the breakwater 100, an ongoing wall of crest elements 101 having optionally slits 118 in between adjacent crest elements.

As schematically shown in FIG. 11 with a dashed line 135, the slant 12 of the breakwater may continue at some distance from the crest elements 101 to provide an interspace between the crest elements and the breakwater. Alternatively some other construction may be provided at some distance from the crest elements to provide such an interspace. Viewed in vertical upward direction and adjacent the crest elements, this interspace is diverging.

As shown in FIG. 11, a fill-material 131 may be provided adjacent the ongoing wall of crest elements in the interspace. This fill-material may comprise soil material like sand, but taking into account that soil material like sand may easily be flushed away by water, the fill-material preferably comprises crumbles of stony material. These crumbles may have a size ranging from about 10 mm to about 10 cm. Further these crumbles may optionally be bonded or partly bonded, by for example an asphalt-compound. The fill-material may alternatively or additionally also comprise asphalt. The fill-material may also comprise a road paving of stones or asphalt. In case of a road adjacent the ongoing wall of crest elements, the filling may consist of a road bed construction (which in general may comprise stony crumbles) and a road paving on top of it. Due to the interspace being diverging adjacent the crest elements, the crest elements will experience a force exerted by the fill-material 131 onto the slanting back faces 125 of the crest elements 101.

The force exerted by the fill-material onto the crest elements can be resolved into a downward parallel component—see arrow A in FIG. 11—parallel to the slanting back face 125 and a transverse component—see arrow B in FIG. 11—transverse to the slanting back face. The angle β shown in FIG. 7—or the complementary angle γ between the back face 125 and the horizontal plane defined by the axis 107 and 108—is preferably such that the transverse force component B does not intersect the slope 12 of the armour layer and is not parallel to the slope 12, in other words the breakwater 100 is preferably configured such that the arrow B of the transverse force component diverges with respect to the slope 12. This in turn boils down to configuring the back face 125 such that it is not perpendicular to the slope 12, but more upright than a perpendicular to the slope.

Assuming the underside of the crest element to be placed horizontally and taking into account that the slope angle α of a breakwater is in general in the range of 30° to 60°, the angle β of the back face with respect to the horizontal underside will in general be about 40° or smaller. In order to ensure the value of the transverse component B being sufficient large to be effective, the angle β is according to the invention about 15° or larger. In order to counteract voids in the fill-material adjacent the back face 125, 126, the angle β is according to the invention about 20° or larger.

Before going to FIG. 12, it is noted that the fill-material 131 may also fill the interspace up to a much lower level or be left away. In this case the part of the crest elements 101 projecting freely upward (i.e. without in horizontal direction being neighboured by fill-material) may form a façade or balustrade, for example a façade or balustrade along a boulevard or road. In case of serving as a façade or balustrade, the angle β of FIG. 7 may for example be 0° or in the range of about 0° to about 5°, in case of a situation in which the forward shift of the center of gravity and back ward shift of the point of rotation might (considered to) be of less importance. Similar applies to FIG. 12 to be discussed now.

Referring now to FIG. 12 a breakwater according to the invention as well as according to the prior art may be constructed as follows in cross section:

- a core body 206 of wide graded rock material defining two slopes, one on the sea side 202 and one on the harbour side 204; an under layer 207 of larger, but still relatively small rocks, such as rocks of 300 to 1000 kg;
- an seaside armour layer 201;
- a harbour side armour layer 203;
- a sea side toe with relatively large rocks, such as rocks of 1000 to 3000 kg; and
- a harbour side toe with relatively large rocks, such as rocks of 1000 to 3000 kg.

The above construction and dimensions are just an example.

In case of a row of crest elements according to the invention, the armour layers 201 and 203 may at their upper ends be provided with crest elements 101 according to the invention. Preferably, the rest of the armour layer will according to the invention comprise rows of armour elements of the type having a central part from which: two wings extend in opposing directions, and a tail and nose extend in opposing directions transverse to the direction of extension of the wings. These armour elements may for example be armour elements as shown in FIGS. 1-4 of this application, but also other armour elements are conceivable like the ones shown in WO-2018/052292 or WO-2004/009910 of applicant.

As can be seen in FIG. 12, the crest elements 101 of both armour layers define an upwardly diverging interspace 205 in between. This interspace 205 may according to the invention be filled with a fill-material (not shown), for example a fill-material as already discussed in relation to FIG. 11. This fill-material is in large extent shielded against the water by the ongoing wall of crest elements, preventing the fill-material from being flushed away. In addition the forces exerted by the fill material onto the ongoing wall of crest elements improves the strength of the armour layers 201 and 203. In relation to FIG. 12 and the crest elements according to the invention and the optional fill-material according to the invention, it is noted that the rest of the construction of the breakwater 200 of FIG. 12 is by way of example.

It will be understood that the crest element according to the invention, like crest element 101 101 as shown in FIGS. 5-9, may be used in combination with armour elements of the type having a central part from which: two wings extend in opposing directions, and a tail and nose extend in opposing directions transverse to the direction of extension of the wings, like the type of armour element as shown in FIGS. 1-4. However, it will be understood that the design of the front half of the crest element 101 may differ from the design of (the front half of) the armour elements in combination with which it is used.

As a general indication of dimensions, the crest element according to the invention may for example have: a vertical height of 1 to 1.5 m, such as about 1.1 m; a horizontal length from the right to the left of 1.5 to 2.75 m, such as about 2.25 m; a horizontal depth from the back to the front of 1.75 to 3 m, such as about 2.65 m.

The invention embodiments derived thereof may also be worded as set forth in the following clauses:

Clause 1: Crest element for an armour layer of a breakwater, the armour layer being formed by horizontal rows of armour elements, in which:
  each armour element comprises a central part, two wings extending from the central part in opposing directions along a length direction of the breakwater, a tail extending from the central part in a backward direction towards the breakwater and transverse to the length direction of the breakwater, and a nose extending from the central part in a forward direction opposite to the backward direction,
  the wings of the armour elements of each said row are mutually aligned;
  the noses of the armour elements of an above row of armour elements are supported on the armour elements of a below row of armour elements;
wherein the crest element comprises:
a central part,
two wings extending from the central part in opposing directions along, when placed on a breakwater, the length direction of the breakwater,
a nose extending from the central part in a forward direction transverse to the length direction of the breakwater; and
wherein the backside of the central part is a vertically oriented, back face facing in a backward direction opposite to the forward direction.

Clause 2: Crest element according to clause 1,
wherein the backside of the wings is a vertically oriented, back face which may be flush with the back face of the central part.

Clause 3: Crest element according to one of clauses 1-2, wherein the central part, the two wings and the nose are formed as a single part, such as a single part made from concrete.

Clause 4: Crest element according to one of clauses 1-3, wherein the underside of the central part is a horizontal bottom face.

Clause 5: Crest element according to one of clauses 1-4,
wherein an x-axis is defined by the direction of extension of the wings, an y-axis perpendicular to the x-axis is defined by the direction of extension of the nose, and an xy-plane is defined by the plane spanned by the x-axis and y-axis.

Clause 6: Crest element according to clause 5,
wherein the back face of the central part slants with respect to the xy-plane, the slant being, viewed from the underside of the crest element towards the upper side of the crest element, in the forward direction.

Clause 7: Crest element according to one of clauses 5-6,
wherein the angle between the back face of the central part and the xy-plane is at most 80°, such as at most 75° or at most 70°.

Clause 8: Crest element according to one of clauses 5-7,
wherein the angle between the back face of the central part and the xy-plane is at least 50°, such as at least 60°.

Clause 9: Crest element according to one of clauses 5-8,
wherein the angle between the back face of the central part and the xy-plane is in the range of about 55° to about 80°, such as in the range of about 60° to about 75°.

Clause 10: Crest element according to one of clauses 5-9,
wherein the angle between the back face of the central part and the xy-plane is in the range of about 60° to about 70°, such as about 65°.

Clause 11: Armour layer assembly for a breakwater, comprising:
  a plurality of horizontal rows of armour elements,
  a horizontal row of crest elements placed above the upper row of the plurality of horizontal rows of armour elements;
  wherein each crest element is a crest elements according to one of clauses 1-10;
  wherein a said armour element comprises a central part, two wings extending from the central part in opposing directions along a length direction of the breakwater, a tail extending from the central part in a backward direction towards the breakwater and transverse to the length direction of the breakwater, and a nose extending from the central part in a forward direction opposite to the backward direction;
  wherein the wings of the armour elements of each said row are mutually aligned;
  wherein the wings of the crest elements of the row of crest elements are mutually aligned; the noses of the armour elements of an above row of armour elements are supported on the armour elements of a below row of armour elements; and
  wherein the noses of the crest elements of the row of crest elements are supported on the armour elements of the upper row of armour elements.

Clause 12: Assembly according to clause 11,
  wherein the nose of a said armour element of an above said row of armour elements is supported on two wings of two adjacent said armour elements of a below said row of armour elements,
  wherein the wings of a said armour element of the above said row of armour elements are supported on the tails of two adjacent said armour elements of the below row of armour elements,
  wherein the nose of a said crest element of the row of crest elements is supported on two wings of two adjacent said armour elements of the upper row of armour elements, and
  wherein the wings of a said crest element of the row of crest elements are supported on the tails of two adjacent said armour elements of the upper row of armour elements.

Clause 13: Breakwater having at least one sloping side provided with:
  a row of crest elements according to one of the clauses 1-10, or
  an assembly according to one of clauses 11-12.

Clause 14: Breakwater according to clause 13, wherein the breakwater further has a top, and the crest elements are according to one of the clause 6-10,
  wherein the row of crest elements is provided below the top of the breakwater such that an interspace is defined between the back faces of the row of crow of crest elements and the breakwater or another construction provided on the breakwater,
  wherein the interspace, viewed in vertical upward direction and adjacent the back faces, diverges, and
  wherein the interspace is filled with a fill-material exerting on the back faces a force having a component parallel to the back face and a component transverse to the back face.

Clause 15: Breakwater according to clause 13, wherein the breakwater has two opposite, sloping sides coming together at a top of the breakwater, and the crest elements are according to one of the clauses 6-10, wherein the rows of crest elements are arranged at the top of the breakwater such that the back faces of both rows define, viewed in vertical upward direction, a diverging interspace, and wherein the diverging interspace is filled with a fill-material exerting on the back faces a force having a component parallel to the respective back face and a component transverse to the respective back face.

Clause 16: Breakwater according to clause 14 or 15, wherein the fill-material comprises crumbles of stony material and/or asphalt, like an asphalt road.

Clause 17: Breakwater according to one of clauses 14-16, wherein the angle of the back face of the central part with respect to the horizontal plane is configured such that a line perpendicular to the back face defines an angle with respect to the horizontal plane which is smaller than the angle of the slope with respect to the horizontal plane.

Clause 18: Method of cresting an armour layer of a breakwater, wherein the cresting is provided by placing a horizontal row of crest elements according to one of the clause 1-10.

Clause 19: Method of providing an armour on the sloping side of a breakwater, wherein the sloping side is provided by placing an armour layer assembly according to one of the clauses 11-12 on the sloping side.

Clause 20: Method of providing a breakwater, wherein the breakwater provided is a breakwater according to one of the clauses 13-17.

The terms horizontal, vertical, forward (direction), backward (direction), underside, upper side, left and right as used throughout this application relate to the position of the armour respectively crest element when in use, placed on a slope of a breakwater.

The invention claimed is:

1. An armor layer assembly for a breakwater, comprising:
    a plurality of horizontal rows of armor elements; and
    a horizontal row of crest elements,
    wherein each armor element of said armor elements comprises a central part with protrusions that consist of:
        two wings extending from the central part in opposing directions along a length direction of the breakwater,
        a tail extending from the central part in a backward direction towards the breakwater and transverse to the length direction of the breakwater, and
        a nose extending from the central part in a forward direction opposite to the backward direction,
    wherein the wings of the armor elements of each horizontal row of said horizontal rows of armor elements are mutually aligned,
    wherein the noses of the armor elements of an above horizontal row of said horizontal rows of armor elements are supported on the armor elements of a below horizontal row of said horizontal rows of armor elements,
    wherein each crest element of said crest elements comprises a central part with protrusions,
    said central part having an upper side, a lower side, a backside, a front side, a left side, and a right side,
    and the protrusions of each crest element consisting of:
        two wings, extending from the right side and the left side, respectively, of the central part in opposing directions along, when placed on a breakwater, the length direction of the breakwater, and
        a nose extending from the front side of the central part in a forward direction transverse to the length direction of the breakwater,
    wherein the wings of the crest elements of the horizontal row of crest elements are mutually aligned,
    wherein the horizontal row of crest elements is placed above an upper one of said horizontal rows of armor elements with the noses of the crest elements of the horizontal row of crest elements supported on top of the armor elements of the upper one of said horizontal rows of armor elements,
    wherein the backside of the central part of the crest elements is a vertically-oriented, back face facing in the backward direction opposite to the forward direction, and
    wherein the wings of each of said crest elements have a backside which is a vertically-oriented back face flush with the back face of the central part of a respective crest element of said crest elements.

2. The armor layer assembly according to claim 1, wherein the central part, the two wings and the nose of said crest element are formed as a single part.

3. The armor layer assembly according to claim 1, wherein the underside of the central part of said crest element is a horizontal bottom face.

4. The armor layer assembly according to claim 1, wherein an x-axis is defined by the direction of extension of the wings, a y-axis perpendicular to the x-axis is defined by the direction of extension of the nose, and an xy-plane is defined by the plane spanned by the x-axis and y-axis.

5. The armor layer assembly according to claim 4, wherein the back face of the central part of said crest element slants with respect to the xy-plane, the slant being, viewed from the underside of the crest element towards the upper side of the crest element, in the forward direction.

6. The armor layer assembly according to claim 4, wherein an angle between the back face of the central part of said crest element and the xy-plane is at most 80°.

7. The armor layer assembly according to claim 4, wherein an angle between the back face of the central part of said crest element and the xy-plane is at least 50°.

8. The armor layer assembly according to claim 4, wherein an angle between the back face of the central part of said crest element and the xy-plane is in the range of about 55° to about 80°.

9. The armor layer assembly according to claim 4, wherein an angle between the back face of the central part of said crest element and the xy-plane is in the range of about 60° to about 70°.

10. The armor layer assembly according to claim 1, wherein the nose of said armor element of an above said row of armor elements is supported on two wings of two adjacent said armor elements of a below said row of armor elements,
    wherein the wings of said armor element of the above said row of armor elements are supported on the tails of two adjacent said armor elements of the below row of armor elements,
    wherein the nose of said crest element of the row of crest elements is supported on top of two wings of two adjacent said armor elements of the upper row of armor elements, and
    wherein the wings of said crest element of the row of crest elements are supported on top of the tails of two adjacent said armor elements of the upper row of armor elements.

11. The armor assembly according to claim 1, wherein the back faces of the wings of each said crest element are, viewed in a length direction of the breakwater, co-planar with the back face of the central part of the respective crest element to provide smooth transitions from the back faces of the wings to the back face of the central part.

12. A breakwater, comprising at least one sloping side provided with an assembly according to claim 1.

13. The breakwater according to claim 12, wherein the breakwater further comprises a top,
   wherein an x-axis is defined by the direction of extension of the wings, a y-axis perpendicular to the x-axis is defined by the direction of extension of the nose, and an xy-plane is defined by the plane spanned by the x-axis and y-axis,
   wherein the back face of the central part of said crest element slants with respect to the xy-plane, the slant being, viewed from the underside of the crest element towards the upper side of the crest element, in the forward direction,
   wherein the row of crest elements is provided below the top of the breakwater such that an interspace is defined between the back faces of the row of crest elements and the breakwater or another construction provided on the breakwater,
   wherein the interspace, viewed in vertical upward direction and adjacent the back faces of the crest elements, diverges, and
   wherein the interspace is filled with a fill-material exerting on the back faces of the crest elements a force having a component parallel to the back face of the crest element and a component transverse to the back face of the crest element.

14. The breakwater according to claim 12, wherein the breakwater comprises two opposite, sloping sides coming together at a top of the breakwater,
   wherein an x-axis is defined by the direction of extension of the wings, a y-axis perpendicular to the x-axis is defined by the direction of extension of the nose, and an xy-plane is defined by the plane spanned by the x-axis and y-axis,
   wherein the back face of the central part of said crest element slants with respect to the xy-plane, the slant being, viewed from the underside of the crest element towards the upper side of the crest element, in the forward direction,
   wherein the rows of crest elements are arranged at the top of the breakwater such that the back faces of both rows of crest elements define, viewed in vertical upward direction, a diverging interspace, and
   wherein the diverging interspace is filled with a fill-material exerting on the back faces of the crest elements a force having a component parallel to the respective back face and a component transverse to the respective back face.

15. The breakwater according to claim 13, wherein the fill-material comprises crumbles of stony material and/or asphalt.

16. The breakwater according to claim 13, wherein an angle of the back face of the central part of the crest elements with respect to the horizontal plane is configured such that a line perpendicular to the back face of the crest elements defines an angle with respect to the horizontal plane which is smaller than the angle of the slope with respect to the horizontal plane.

17. A method of providing an armor on the sloping side of a breakwater, wherein the sloping side is provided by placing an armor layer assembly according to claim 1 on the sloping side.

18. A method of providing a breakwater, wherein the breakwater provided is a breakwater according to claim 12.

* * * * *